United States Patent
Bansal et al.

(10) Patent No.: US 11,106,523 B2
(45) Date of Patent: Aug. 31, 2021

(54) METHOD AND SYSTEM FOR INTELLIGENTLY RESOLVING FAILURES RECURRING IN INFORMATION TECHNOLOGY ENVIRONMENTS

(71) Applicant: EMC IP Holding Company LLC, Hopkinton, MA (US)

(72) Inventors: Aaditya Rakesh Bansal, Bangalore (IN); Tushar B. Dethe, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 29 days.

(21) Appl. No.: 16/169,973

(22) Filed: Oct. 24, 2018

(65) Prior Publication Data
US 2020/0133755 A1 Apr. 30, 2020

(51) Int. Cl.
| | | |
|---|---|---|
| *G06F 11/07* | (2006.01) | |
| *G06F 11/14* | (2006.01) | |
| *G06F 11/00* | (2006.01) | |
| *G06N 7/00* | (2006.01) | |
| *H04L 12/24* | (2006.01) | |
| *G06N 20/00* | (2019.01) | |

(52) U.S. Cl.
CPC .......... *G06F 11/079* (2013.01); *G06F 11/008* (2013.01); *G06F 11/0709* (2013.01); *G06F 11/0793* (2013.01); *G06F 11/1458* (2013.01); *G06N 7/005* (2013.01); *G06N 20/00* (2019.01); *H04L 41/5061* (2013.01); *G06F 2201/81* (2013.01)

(58) Field of Classification Search
CPC .. G06F 11/079; G06F 11/1458; G06F 11/008; G06F 11/0793; G06F 11/0709; G06F 2201/81; G06N 20/00; G06N 7/005; H04L 41/5061
See application file for complete search history.

(56) References Cited

U.S. PATENT DOCUMENTS

| | | | |
|---|---|---|---|
| 6,892,317 B1 * | 5/2005 | Sampath | G06F 11/25 714/4.3 |
| 9,633,051 B1 * | 4/2017 | Maccanti | G06F 11/1451 |
| 10,261,849 B1 * | 4/2019 | Burke | G06F 11/0754 |
| 2014/0310222 A1 * | 10/2014 | Davlos | G06F 11/2294 706/46 |
| 2018/0095814 A1 * | 4/2018 | Patil | G06F 11/0709 |
| 2019/0147300 A1 * | 5/2019 | Bathen | G06K 9/6284 706/12 |
| 2019/0296989 A1 * | 9/2019 | Racine | G06N 20/00 |

* cited by examiner

*Primary Examiner* — Bryce P Bonzo
*Assistant Examiner* — Michael Xu
(74) *Attorney, Agent, or Firm* — Chamberlain, Hrdlicka, White, Williams & Aughtry

(57) ABSTRACT

A method and system for intelligently resolving failures recurring in information technology (IT) environments. Specifically, the method and system disclosed herein may be directed to the resolution of persistently-occurring failures observed in data backup and/or data recovery operations. Further, resolution of any given persistently-occurring failure may entail the identification of zero, one, or more solutions (e.g., patches and/or other instructions) based on the analyses of failure-related information and host-related configuration information using machine learning and/or artificial intelligence paradigms. In cases where zero solutions are identified, the conventional and manual investigative route by way of support ticketing may be pursued.

16 Claims, 14 Drawing Sheets

METHOD AND SYSTEM FOR INTELLIGENTLY RESOLVING FAILURES RECURRING IN INFORMATION TECHNOLOGY ENVIRONMENTS

BACKGROUND

Presently, a recurring issue plaguing any information technology environment requires the engagement of product support, whom are tasked with troubleshooting the recurring issue. The process, however, transpires at the expense of numerous development work cycles, which impact the availability and/or productivity of environment operations.

DETAILED DESCRIPTION

Figure 1:
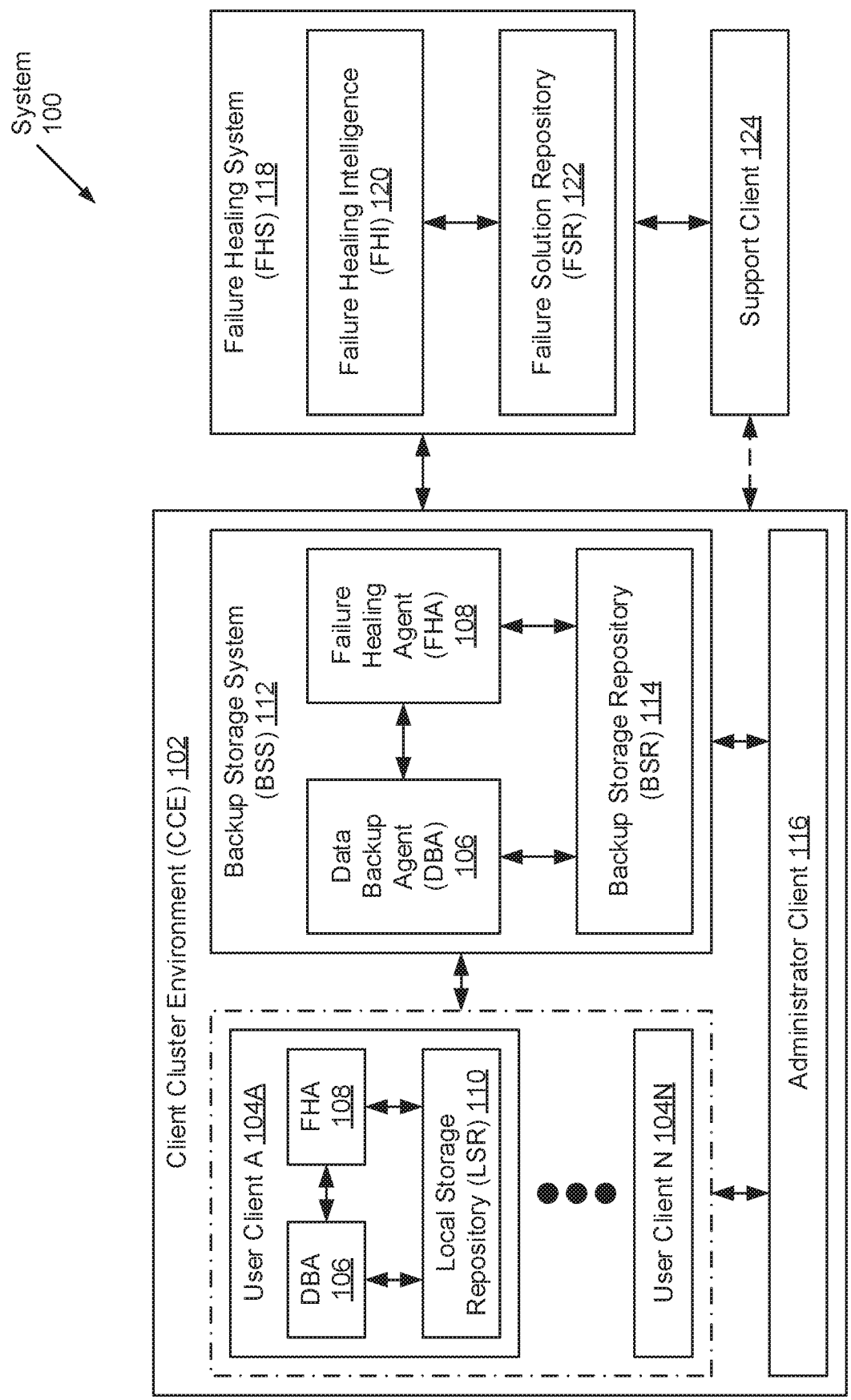
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8E, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for intelligently resolving failures recurring in information technology (IT) environments. Specifically, one or more embodiments of the invention may be directed to the resolution of persistently-occurring failures observed in data backup and/or data recovery operations. Further, resolution of any given persistently-occurring failure may entail the identification of zero, one, or more solutions (e.g., patches and/or other instructions) based on the analyses of failure-related information and host-related configuration information using machine learning and/or artificial intelligence paradigms. In cases where zero solutions are identified, the conventional and manual investigative route by way of support ticketing may be pursued.

When faced with a recurring issue (i.e., a persistently-occurring failure) in an IT environment, the current standard practice involves submitting a help request to a relevant support ticketing system, which relays the help request to individuals of an IT support team whom subsequently analyze and try to address the recurring issue. Following an unsuccessful resolution by the IT support team, the current standard practice suggests contacting other parties, which may include the developers of a particular software application, the manufacturers of a particular physical computing system, etc. Further, should another similar recurring issue arise, that other similar recurring issue may warrant its own separate investigation by one or more parties whether or not an available solution resolving the former recurring issue has been found and delivered. That is, though the available solution may resolve the latter recurring issue as well, the connection is often not made, which yields an inefficient methodology for addressing recurring issues.

In contrast, embodiments of the invention propose a different mechanism for providing available solutions to observed recurring issues without the time-consuming and inefficient involvement of the IT support team, software application developers, computing system manufacturers, and others. Specifically, one or more embodiments of the invention provide a "no-gap data protection" approach to addressing recurring issues, which facilitates the immediate availability and deployment of available solutions to recurring issues arising in IT environments. Subsequently, one or more embodiments of the invention expedite the recurring issue troubleshooting process, thereby expediting the turn-around time expended from the observance of the recurring issue to the deployment of a solution. Moreover, embodiments of the invention may also alleviate the potential backlog of help requests that could congest a support ticketing system by filtering scenarios that require human intervention. Additionally, one or more embodiments of the invention may function as an available solution management and/or maintenance system comparable to a supply chain management system, where tracked information, such as the frequency of deployment of the various available solutions, may be used to infer or identify which available solutions subset needs reworking, refactoring, and/or further development.

FIG. 1 shows a system in accordance with one or more embodiments of the invention. The system (100) may include a client cluster environment (CCE) (102), a failure healing system (FHS) (118), and a support client (124). Each of these components is described below.

In one embodiment of the invention, the above-mentioned components may be directly or indirectly connected to one another through a network (not shown) (e.g., a local area network (LAN), a wide area network (WAN) such as the Internet, a mobile network, etc.). The network may be implemented using any combination of wired and/or wireless connections. In embodiments in which the above-mentioned components are indirectly connected, there may be other networking components or systems (e.g., switches, routers, gateways, etc.) that facilitate communications, information exchange, and/or resource sharing. Further, the above-mentioned components may communicate with one another using any combination of wired and/or wireless communication protocols.

In one embodiment of the invention, the CCE (102) may represent datacenter and/or cloud computing infrastructure directed to one or more usage scenarios. Datacenter and/or cloud computing infrastructure, in turn, may refer to a configuration of various information technology (IT) components (e.g., servers, storage, networking, management, etc.) designed to service those one or more usage scenarios. Further, the CCE (102) may be implemented using at least one or more user clients (104A-104N), a backup storage system (BSS) (112), and an administrator client (116) operatively connected to one another. Each of these CCE (102) subcomponents is described below.

In one embodiment of the invention, each user client (104A-104N) may represent any physical computing system operated by one or more users of the CCE (102). A user of the CCE (102) may be an individual or an entity whom utilizes a user client (104A-104N) to perform, for example, large-scale and complex data processing. Examples of each user client (104A-104N) may include, but are not limited to, a desktop computer, a laptop computer, a tablet computer, a server, a mainframe, a smartphone, or any other computing system similar to the exemplary computing system shown in FIG. 7. Further, each user client (104A-104N) may include at least a data backup agent (DBA) (106), a failure healing agent (FHA) (108), and a local storage repository (LSR) (110). Each of these user client (104A-104N) subcomponents is described below.

In one embodiment of the invention, the DBA (106) (on each user client (104A-104N)) may be a computer program or process (i.e., an instance of a computer program) that executes on the underlying hardware (e.g., one or more computer processors) of a user client (104A-104N). Specifically, the DBA (106) may be a computer program or process tasked with, at least in part, managing data backup and recovery operations on a user client (104A-104N). To that extent, the DBA (106) may include functionality to: generate data backups of various information stored in the LSR (110); submit the generated data backups to the BSS (112) for redundant consolidation; and, when certain occasions arise (e.g., following failover events), retrieve the data backups from the BSS (112) to restore the various information on the user client (104A-104N). In one embodiment of the invention, the DBA (106) may include further functionality to: detect persistently-occurring failures affecting one or more data backup and/or data recovery operations transpiring on a user client (104A-104N); and notify the FHA (108) of the detected persistently-occurring failures. One of ordinary skill will appreciate that the DBA (106) may perform other functionalities without departing from the scope of the invention.

In one embodiment of the invention, the FHA (108) (on each user client (104A-104N)) may be a computer program or process (i.e., an instance of a computer program) that executes on the underlying hardware (e.g., one or more computer processors) of a user client (104A-104N). Specifically, the FHA (108) may be a computer program or process tasked with, at least in part, managing the resolution of persistently-occurring failures affecting one or more data backup and/or data recovery operations transpiring on a user client (104A-104N). To that extent, the FHA (108) may include functionality to perform any of the various steps outlined in FIGS. 4 and 5 in accordance with embodiments of the invention. One of ordinary skill will appreciate that the FHA (108) may perform other functionalities without departing from the scope of the invention.

In one embodiment of the invention, the LSR (110) may represent a collection of one or more physical storage devices and/or media on which various forms of information—pertinent to a user client (104A-104N)—may be consolidated. The one or more physical storage devices and/or media may or may not be of the same type. Further, information consolidated in the LSR (110) may be arranged by way of any storage mechanism (e.g., a filesystem, a collection of tables or records, etc.). In one embodiment of the invention, the LSR (110) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the BSS (112) may represent a data backup, archiving, and/or disaster recovery storage system. The BSS (112) may be implemented using one or more servers (not shown). Each server may be a physical server (i.e., which may reside in a datacenter) or a virtual server (i.e., which may reside in a cloud computing environment). In one embodiment of the invention, the BSS (106) may be implemented using one or more computing systems similar to the exemplary computing system shown in FIG. 7. Further, the BSS (112) may include at least a DBA (106), a FHA (108), and a backup storage repository (BSR) (114). Each of these BSS (112) subcomponents is described below.

In one embodiment of the invention, the DBA (106) (on the BSS (112)) may be a computer program or process (i.e., an instance of a computer program) that executes on the underlying hardware (e.g., one or more computer processors) of the BSS (112). Specifically, the DBA (106) may be a computer program or process tasked with, at least in part, managing data backup and recovery operations on the BSS (112). To that extent, the DBA (106) may include functionality to: receive data backups of various client-pertinent information from one or more user clients (104A-104N); consolidate the received data backups in the BSR (114); and, when certain occasions arise (e.g., following failover events), retrieve the data backups from the BSR (114) and provide the retrieved data backups to one or more user clients (104A-104N) in order to restore various client-pertinent information thereon. In one embodiment of the invention, the DBA (106) may include further functionality to: detect persistently-occurring failures affecting one or more data backup and/or data recovery operations transpiring on the BSS (112); and notify the FHA (108) of the detected persistently-occurring failures. One of ordinary skill will appreciate that the DBA (106) may perform other functionalities without departing from the scope of the invention.

In one embodiment of the invention, the FHA (108) (on the BSS (112)) may be a computer program or process (i.e., an instance of a computer program) that executes on the underlying hardware (e.g., one or more computer processors) of the BSS (112). Specifically, the FHA (108) may be a computer program or process tasked with, at least in part, managing the resolution of persistently-occurring failures affecting one or more data backup and/or data recovery operations transpiring on the BSS (112). To that extent, the FHA (108) may include functionality to perform any of the various steps outlined in FIGS. 4 and 5 in accordance with embodiments of the invention. One of ordinary skill will appreciate that the FHA (108) may perform other functionalities without departing from the scope of the invention.

In one embodiment of the invention, the BSR (114) may represent a collection of one or more physical storage devices and/or media on which various forms of information—pertinent to one or more user clients (104A-104N) and the BSS (112)—may be consolidated. The one or more physical storage devices and/or media may or may not be of the same type. Further, information consolidated in the BSR (114) may be arranged by way of any storage mechanism (e.g., a filesystem, a collection of tables or records, etc.). In one embodiment of the invention, the BSR (114) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the administrator client (116) may represent any physical computing system operated by one or more administrators of the CCE (102). An administrator of the CCE (102) may be an individual or entity whom may be responsible for overseeing operations and maintenance pertinent to the CCE (102). Further, the administrator client (116) may include functionality to: receive environment-related advisories from the FHS (118), where the environment-related advisories may inform an administrator of the CCE (102) that detected persistently-occurring failures transpiring on a user client (104A-104N) or the BSS (112) may be caused by environment configuration issues; and, based on results obtained from an administrator-led investigation of the environment configuration issues, transmit environment-related advisory feedback to the FHS (118). One of ordinary skill will appreciate that the administrator client (116) may perform other functionalities without departing from the scope of the invention. Examples of the administrator client (116) may include, but are not limited to, a desktop computer, a laptop computer, a tablet computer, a server, a mainframe, a smartphone, or any other computing system similar to the exemplary computing system shown in FIG. 7.

In one embodiment of the invention, the FHS (118) may represent a recurring failure investigation and resolution service. The FHS (118) may be implemented using one or more servers (not shown). Each server may be a physical server (i.e., which may reside in a datacenter) or a virtual server (i.e., which may reside in a cloud computing environment). In one embodiment of the invention, the FHS (118) may be implemented using one or more computing systems similar to the exemplary computing system shown in FIG. 7. Further, the FHS (118) may include at least a failure healing intelligence (FHI) (120) and a failure solution repository (FSR) (122). Each of these FHS (118) subcomponents is described below.

In one embodiment of the invention, the FHI (120) may be a computer program or process (i.e., an instance of a computer program) that executes on the underlying hardware (e.g., one or more computer processors) of the FHS (118). Specifically, the FHI (120) may be a computer program or process tasked with, at least in part, investigating and providing resolutions for persistently-occurring failures affecting one or more data backup and/or data recovery operations transpiring on one or more user clients (104A-104N) and the BSS (112). To that extent, the FHI (120) may include functionality to perform any of the various steps outlined in FIGS. 6A-6C in accordance with embodiments of the invention. One of ordinary skill will appreciate that the FHI (120) may perform other functionalities without departing from the scope of the invention.

In one embodiment of the invention, the FSR (122) may represent a collection of one or more physical storage devices and/or media on which various forms of information—pertinent to the FHS (118)—may be consolidated. The one or more physical storage devices and/or media may or may not be of the same type. Further, information consolidated in the FSR (122) may be arranged by way of any storage mechanism (e.g., a filesystem, a collection of tables or records, etc.). In one embodiment of the invention, the FSR (122) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Moreover, the FSR (118) is described in further detail below with respect to FIG. 3.

In one embodiment of the invention, the support client (124) may represent any physical computing system operated by one or more support specialists of the CCE (102). A support specialist of the CCE (102) may be an individual or entity whom may be responsible for troubleshooting hardware, software, and/or network issues pertinent to the CCE (102). Further, the support client (124) may include functionality to: receive failure support requests from the FHS (118) when the FHS (118) fails to identify suitable solutions for persistently-occurring failures affecting one or more data backup and/or data recovery operations transpiring on one or more user clients (104A-104N) and/or the BSS (112). One of ordinary skill will appreciate that the support client (124) may perform other functionalities without departing from the scope of the invention. Examples of the support client (124) may include, but are not limited to, a desktop computer, a laptop computer, a tablet computer, a server, a mainframe, a smartphone, or any other computing system similar to the exemplary computing system shown in FIG. 7.

While FIG. 1 shows a configuration of components, other system configurations may be used without departing from the scope of the invention.

Figure 2:
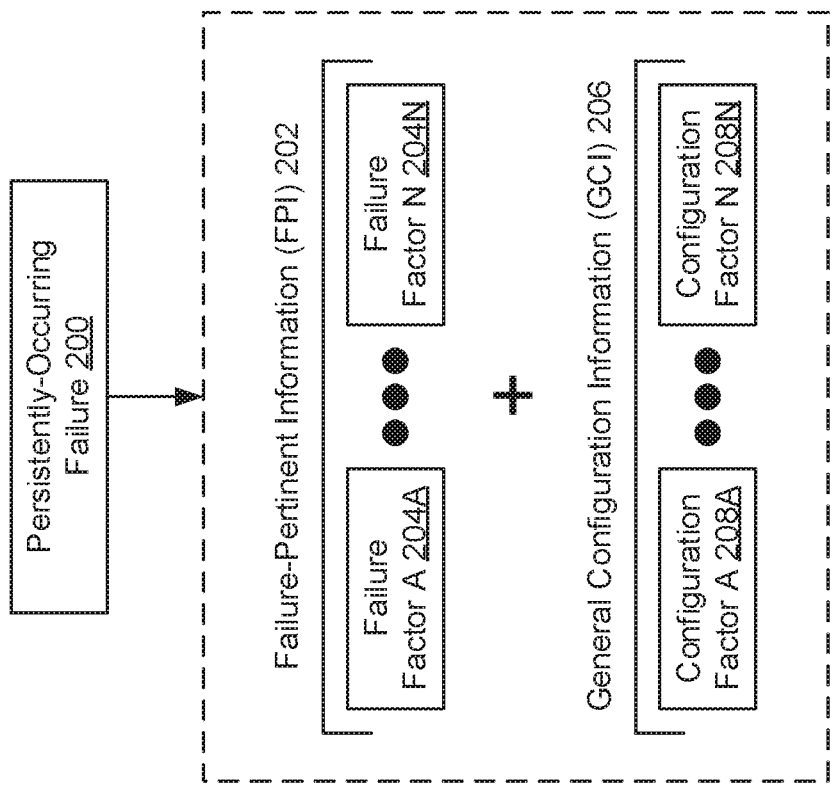
FIG. 2 shows investigation pertinent information in accordance with one or more embodiments of the invention.

FIG. 2 shows investigation pertinent information in accordance with one or more embodiments of the invention. Investigation pertinent information may refer to information surrounding a persistently-occurring failure (200), which may be critical towards identifying one or more resolutions (if any) for addressing the persistently-occurring failure (200). A persistently-occurring failure (200) may represent any repeating error (i.e., an error observed to have occurred two or more times) that results from the performance of at least a portion of one or more data backup and/or recovery operations instantiated on a user client or the backup storage system (BSS) (see e.g., FIG. 1). Further, the investigation pertinent information may include failure-pertinent information (FPI) (202) and general configuration information (GCI) (206). Each of these information categories is described below.

In one embodiment of the invention, FPI (202) may collectively represent metadata that describes the persistently-occurring failure (200). To that extent, FPI (202) may encompass one or more failure factors (204A-204N). Each failure factor (204A-204N) may be a piece of tracked information associated with the persistently-occurring failure (200), which may be generated and/or updated at the onset of each time that the persistently-occurring failure (200) is observed. Further, each failure factor (204A-204N) may be tracked by, for example, the data backup agent (DBA) (see e.g., FIG. 1) and/or operating system (OS) residing on a user client and/or the BSS. Examples of failure factors (204A-204N) may include, but are not limited to: an error code or identifier assigned to the persistently-occurring failure (200), which uniquely identifies the persistently-occurring failure (200); an error message or description associated with the persistently-occurring failure (200), which concisely defines the persistently-occurring failure (200); and a failure stage associated with the persistently-occurring failure (200), which identifies a particular stage or step of a data backup and/or recovery operation during which the persistently-occurring failure (200) transpires.

In one embodiment of the invention, GCI (206) may collectively represent metadata that describes the computing environment on which the persistently-occurring failure (200) has been observed. To that extent, GCI (206) may encompass one or more configuration factors (208A-208N). Each configuration factor (208A-208N) may be a piece of tracked information associated with hardware and/or software installed on the host (e.g., a user client or the BSS) on which a data backup and/or recovery operation is being performed. Further, each configuration factor (208A-028N) may be tracked by, for example, the DBA (see e.g., FIG. 1) and/or OS residing on the aforementioned host. Examples of configuration factors (208A-208N) may include, but are not limited to: an application type associated with a computer program (i.e., software application) installed on the host, where the computer program may be responsible for performing the data backup and/or recovery operation during which the persistently-occurring failure (200) transpired; an application configuration associated with the aforementioned computer program, where the application configuration outlines one or more parameters (e.g., incremental or full backup, data component being backed up, destination media, etc.) used in the execution of the data backup and/or recovery operation during which the persistently-occurring failure (200) transpired; and an applicable OS executing on the host on which the persistently-occurring failure (200) transpired during the performance of the data backup and/or recovery operation.

Figure 3:
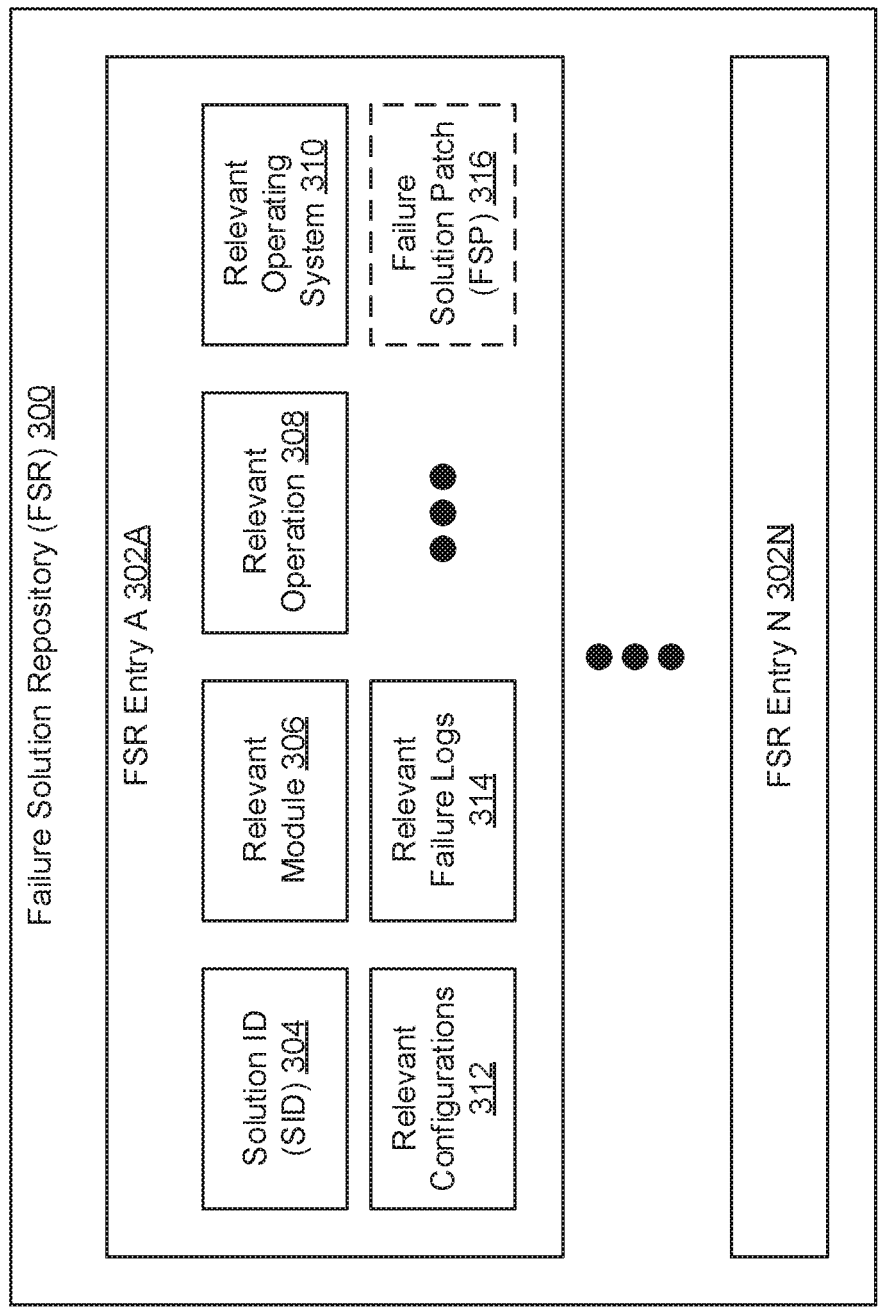
FIG. 3 shows a failure solution repository in accordance with one or more embodiments of the invention.

FIG. 3 shows a failure solution repository (FSR) in accordance with one or more embodiments of the invention. The FSR (300), as described above, may represent a collection of one or more physical storage devices and/or media on which information pertaining to available solutions, which may address one or more persistently-occurring failures, may be consolidated. These available solutions may be consolidated in the form of one or more FSR entries (302A-302N). Further, each FSR entry (302A-302N)—pertaining to a given available solution—may include, but is not limited to including: a solution identifier (SID) (304), a relevant module (306), a relevant operation (308), a relevant operating system (OS) (310), one or more relevant configurations (312), and one or more relevant logs (314). Moreover, any given FSR entry (302A-302N) may or may not include a failure solution patch (FSP) (316). Each of these data items is described below.

In one embodiment of the invention, the SID (304) may refer to a string of characters (e.g., letters, numbers, symbols, etc.) that may uniquely identify the given available solution. The SID (304) may extend any length and may encompass any combination of characters. By way of an example, the SID (304) may be represented through an alphanumeric string or a N-bit integer (where N>0) expressed in hexadecimal notation.

In one embodiment of the invention, the relevant module (306) may refer to metadata identifying a computer program (i.e., a software application) with which the given available solution may be associated. That is, the given available solution may address a persistently-occurring failure, which may have been observed during a data backup and/or recovery operation managed by the computer program.

In one embodiment of the invention, the relevant operation (306) may refer to metadata identifying an operation (e.g., a data backup operation or data recovery operation), and/or a stage or step of the operation, with which the given available solution may be associated. That is, the given available solution may address a persistently-occurring failure, which may have been observed during a particular stage or step of a data backup operation or, alternatively, a particular stage or step of a data recovery operation.

In one embodiment of the invention, the relevant OS (310) may refer to metadata identifying a host OS with which the given available solution may be associated. That is, the given available solution may address a persistently-occurring failure, which may have been observed on a host (e.g., a user client or the backup storage system (BSS) (see e.g., FIG. 1)) whose operations may be supervised by the host OS.

In one embodiment of the invention, the relevant configuration(s) (312) may refer to metadata identifying one or more execution parameters of an operation (e.g., a data backup operation or data recovery operation) with which the given available solution may be associated. That is, the given available solution may address a persistently-occurring failure, which may have been observed during a data backup operation or a data recovery operation defined through the one or more execution parameters. Examples of execution parameters may include, but are not limited to: a parameter indicating whether the data backup/recovery operation involves a full or incremental backup; a parameter indicating the data component being backed up or recovered; a parameter indicating the destination media (e.g., disk, tape, cloud storage, etc.) to or from which the data component may be consolidated or retrieved, etc.

In one embodiment of the invention, the relevant failure log(s) (314) may refer to one or more metadata describing the error (i.e., persistently-occurring failure) with which the given available solution may be associated. That is, the given available solution may address a persistently-occurring failure, which may be identified or described through one or more pieces of information. Examples of metadata describing a persistently-occurring failure may include, but are not limited to: an error code or identifier assigned to the persistently-occurring failure, which uniquely identifies the persistently-occurring failure; an error message or description associated with the persistently-occurring failure, which concisely defines the persistently-occurring failure, etc.

In one embodiment of the invention, the FSP (316) (if included) may refer to an upgrade, a patch, and/or a fix for one or more computer programs (e.g., an operating system (OS), one or more software applications, etc.) that may be executing on either a user client or the BSS on which the persistently-occurring failure is being observed. The FSP (316) may encompass one or more binary files representative of computer readable program code that may be interpreted and executed by the underlying hardware of the user client or the BSS. In interpreting and executing the one or more binary files, the underlying hardware may apply the FSP (316), thereby implementing the upgrade, patch, and/or fix targeting the one or more computer programs. The FSP (316) may or may not address and/or resolve the persistently-occurring failure.

While FIG. 3 shows a configuration of entries, other entry configurations, including additional or alternative information, may be used without departing from the scope of the invention.

Figure 4:
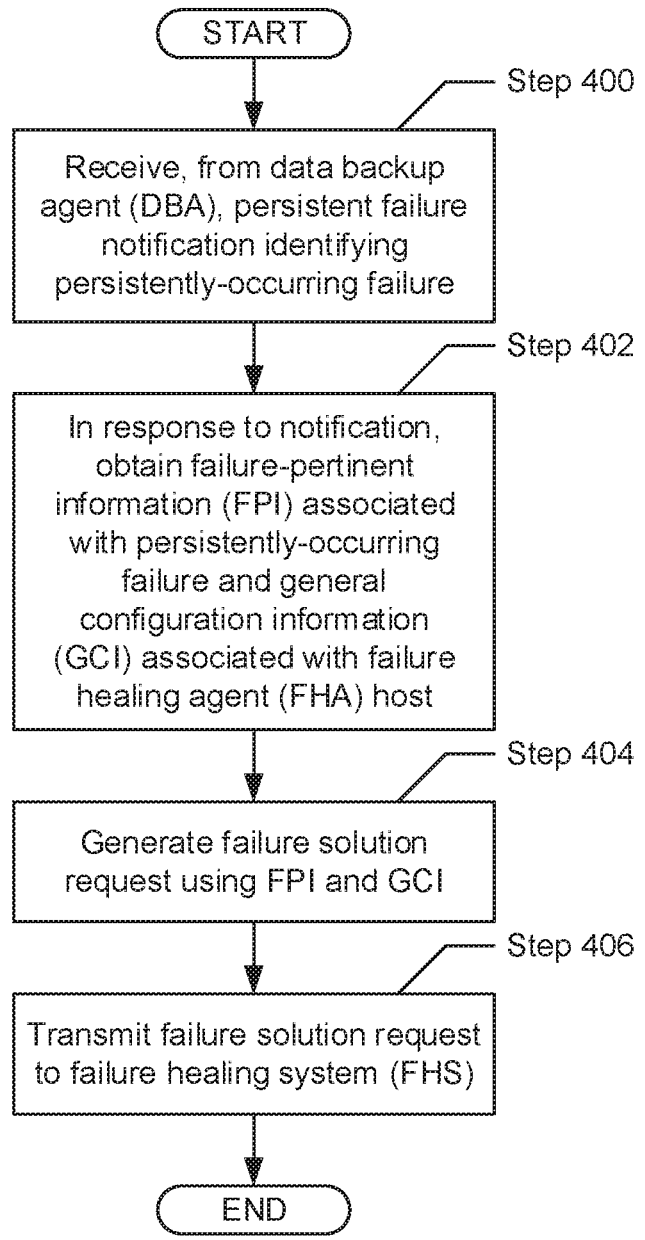
FIG. 4 shows a flowchart describing a method for addressing a persistent failure notification in accordance with one or more embodiments of the invention.

FIG. 4 shows a flowchart describing a method for addressing a persistent failure notification in accordance with one or more embodiments of the invention. The various steps outlined below may be performed by the failure healing agent (FHA) either residing on a user client or the backup storage system (BSS) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a persistent failure notification is received. In one embodiment of the invention, the persistent failure notification may be received from the data backup agent (DBA) (see e.g., FIG. 1) executing on a user client or the BSS. Further, the persistent failure notification may pertain to the observance of a recurring error (i.e., a persistently-occurring failure) transpiring during one or more data backup and/or recovery operations instantiated on the user client or the BSS.

In Step 402, in response to receiving the persistent failure notification (in Step 400), investigation pertinent information is obtained. In one embodiment of the invention, investigation pertinent information may refer to information surrounding a persistently-occurring failure, which may be critical towards identifying one or more resolutions (if any) for addressing the persistently-occurring failure. Further, the obtained investigation pertinent information may include failure-pertinent information (FPI) and general configuration information (GCI).

In one embodiment of the invention, FPI may collectively represent metadata that describes the persistently-occurring failure. To that extent, FPI may encompass one or more failure factors. Each failure factor may be a piece of tracked information associated with the persistently-occurring failure, which may be generated and/or updated at the onset of each time that the persistently-occurring failure is observed. Examples of failure factors may include, but are not limited to: an error code or identifier assigned to the persistently-occurring failure, which uniquely identifies the persistently-occurring failure; an error message or description associated with the persistently-occurring failure, which concisely defines the persistently-occurring failure; and a failure stage associated with the persistently-occurring failure, which identifies a particular stage or step of a data backup and/or recovery operation during which the persistently-occurring failure transpires.

In one embodiment of the invention, GCI may collectively represent metadata that describes the computing environment on which the persistently-occurring failure has been observed. To that extent, GCI may encompass one or more configuration factors. Each configuration factor may be a piece of tracked information associated with hardware and/or software installed on the host (e.g., a user client or the BSS) on which a data backup and/or recovery operation is being performed. Examples of configuration factors may include, but are not limited to: an application type associated with a computer program (i.e., software application) installed on the host, where the computer program may be responsible for performing the data backup and/or recovery operation during which the persistently-occurring failure transpired; an application configuration associated with the aforementioned computer program, where the application configuration outlines one or more parameters (e.g., incremental or full backup, data component being backed up, destination media, etc.) used in the execution of the data backup and/or recovery operation during which the persistently-occurring failure transpired; and an applicable OS executing on the host on which the persistently-occurring failure transpired during the performance of the data backup and/or recovery operation.

In Step 404, a failure solution request is generated. Specifically, in one embodiment of the invention, the failure solution request may be generated using the FPI and GCI (obtained in Step 402). Further, the failure solution request may represent a query directed to identifying any available resolutions that may address the persistently-occurring failure (observed and identified through the persistent failure notification received in Step 400). Thereafter, in Step 406, the failure solution request (generated in Step 404) is transmitted to the failure healing system (FHS) (see e.g., FIG. 1).

Figure 5:
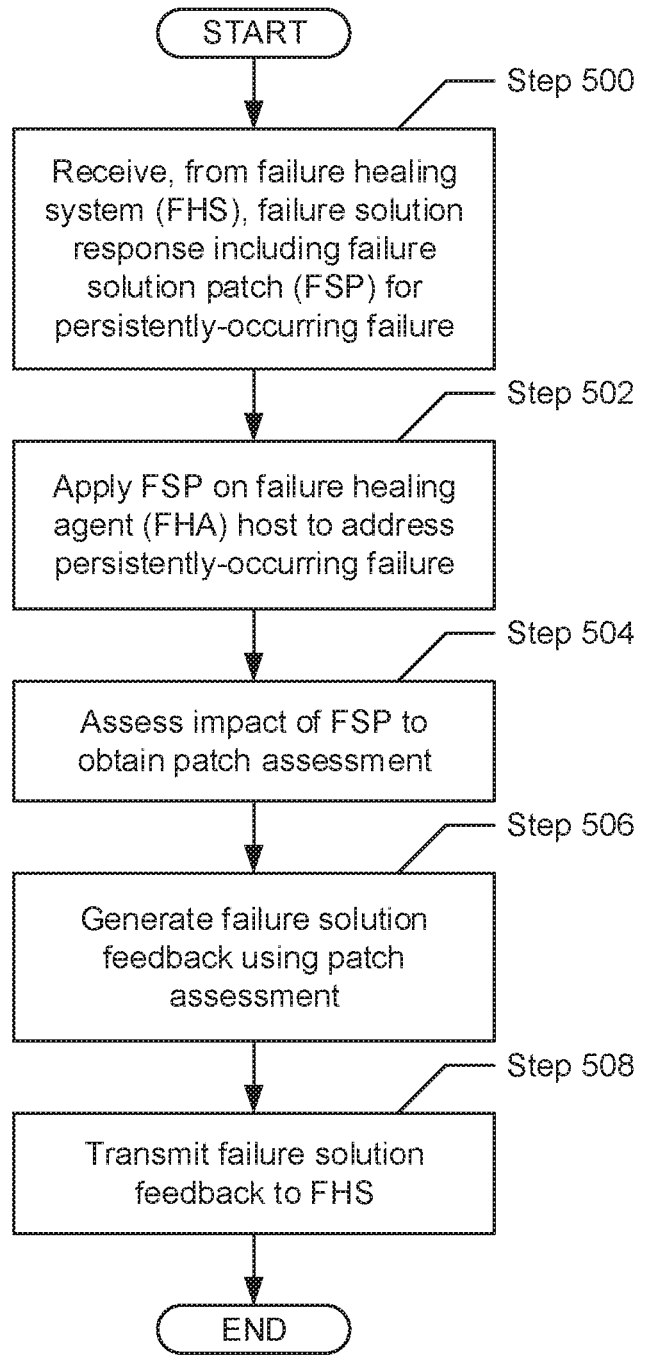
FIG. 5 shows a flowchart describing a method for processing a failure solution response in accordance with one or more embodiments of the invention.

FIG. 5 shows a flowchart describing a method for processing a failure solution response in accordance with one or more embodiments of the invention. The various steps outlined below may be performed by the failure healing agent (FHA) either residing on a user client or the backup storage system (BSS) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a failure solution response is received. Specifically, in one embodiment of the invention, the failure solution response may be received from the failure healing system (FHS) (see e.g., FIG. 1). Further, the failure solution response may be a reply issued in response to the submission of a failure solution request (see e.g., FIG. 4) directed to a query for available resolutions addressing a persistently-occurring failure observed on either a user client or the BSS. Accordingly, the failure solution response may include a failure solution patch (FSP) for the persistently-occurring failure.

In one embodiment of the invention, the FSP may refer to an upgrade, a patch, and/or a fix for one or more computer programs (e.g., an operating system (OS), one or more software applications, etc.) that may be executing on either a user client or the BSS on which the persistently-occurring failure is being observed. Further, the FSP may encompass one or more binary files representative of computer readable program code that may be interpreted and executed by the underlying hardware of the user client or the BSS.

In Step 502, the FSP (obtained via the failure solution response received in Step 500) is applied. In one embodiment of the invention, applying the FSP may entail interpreting and executing, by the underlying hardware of either a user client or the BSS, the above-mentioned one or more binary files. Further, applying the FSP may implement the upgrade, patch, and/or fix targeting the one or more computer programs executing on the user client or the BSS on which the persistently-occurring failure is being observed.

In Step 504, an impact of the FSP (applied in Step 502) is assessed. In one embodiment of the invention, the assessed impact may pertain to the effectiveness of the FSP to address the persistently-occurring failure for which the FSP was sought. Further, assessing the effectiveness of the FSP may entail re-instantiating the one or more data backup and/or recovery operations, which may have been interrupted or halted as a result of the persistently-occurring failure. Through the re-instantiation of these one or more data backup and/or recovery operations, the persistently-occurring failure may, in one embodiment of the invention, still persist; or alternatively, in another embodiment of the invention, may no longer be observed and thus resolved. Moreover, a patch assessment may be derived based at least on the aforementioned evaluation of the effectiveness of the FSP, which may indicate that: (a) the persistently-occurring failure persists, and therefore, the FSP is ineffective; or (b) the persistently-occurring failure has been resolved, and therefore, the FSP is effective.

In Step 506, a failure solution feedback is generated. In one embodiment of the invention, the failure solution feedback may represent the return of information regarding the performance evaluation (i.e., effectiveness) of a given FSP in addressing a given persistently-occurring failure. Accordingly, the failure solution feedback may be generated using the patch assessment (derived in Step 504). Thereafter, in Step 508, the failure solution feedback (generated in Step 506) is transmitted to the FHS (from which the failure solution response had been received in Step 500).

Figure 6A:
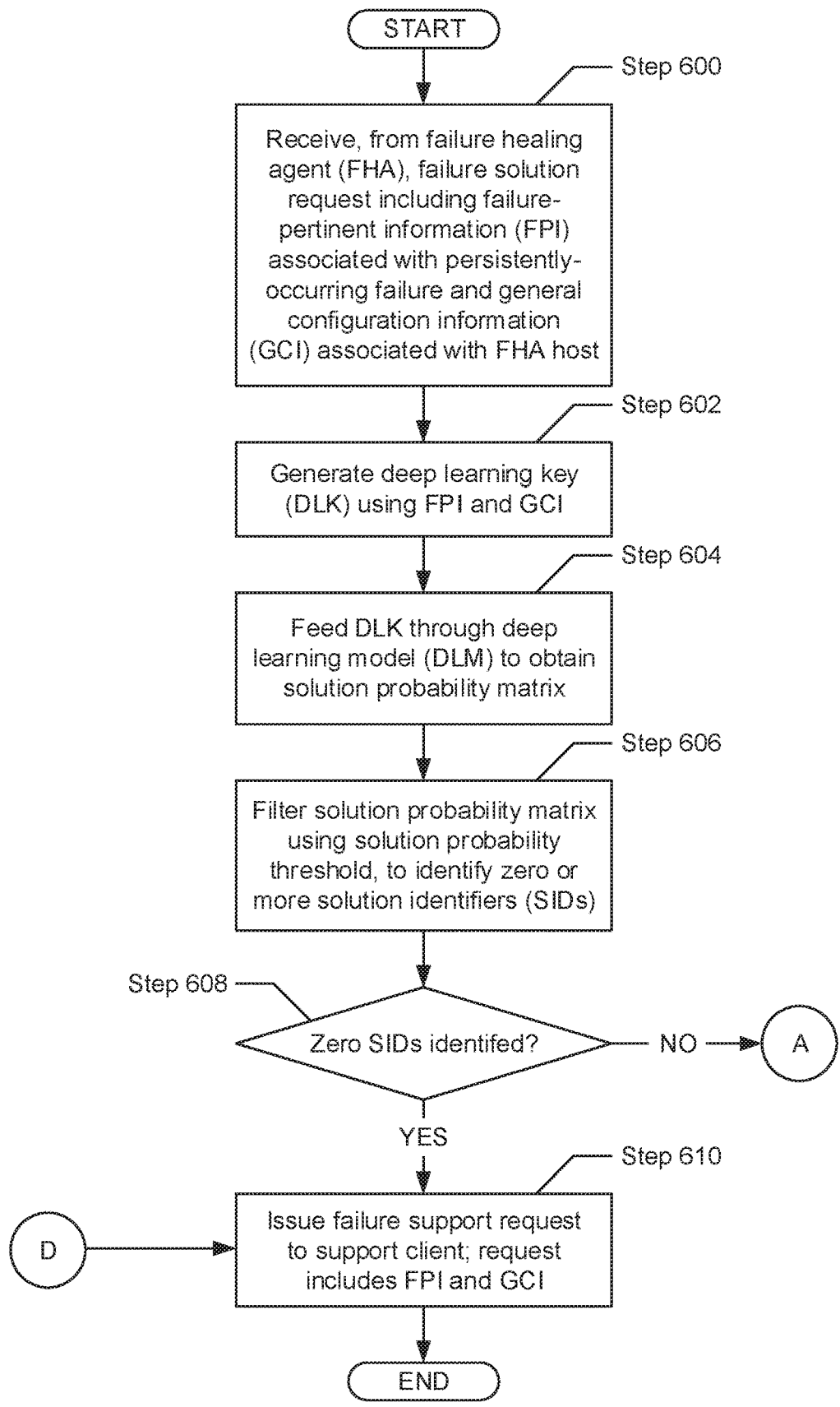
FIGS. 6A-6C show flowcharts describing a method for resolving a failure solution response in accordance with one or more embodiments of the invention.
Figure 6B:
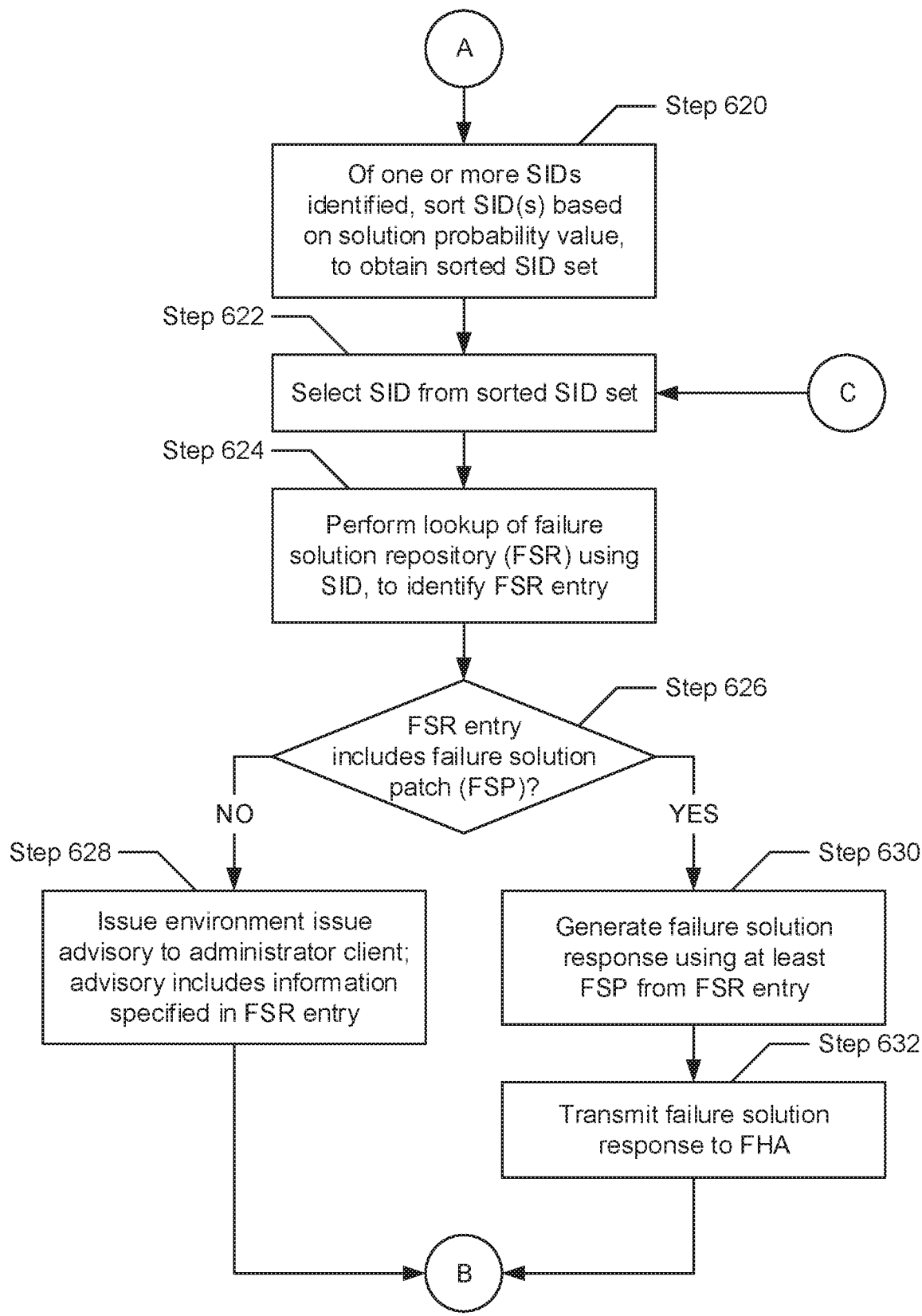
Figure 6C:
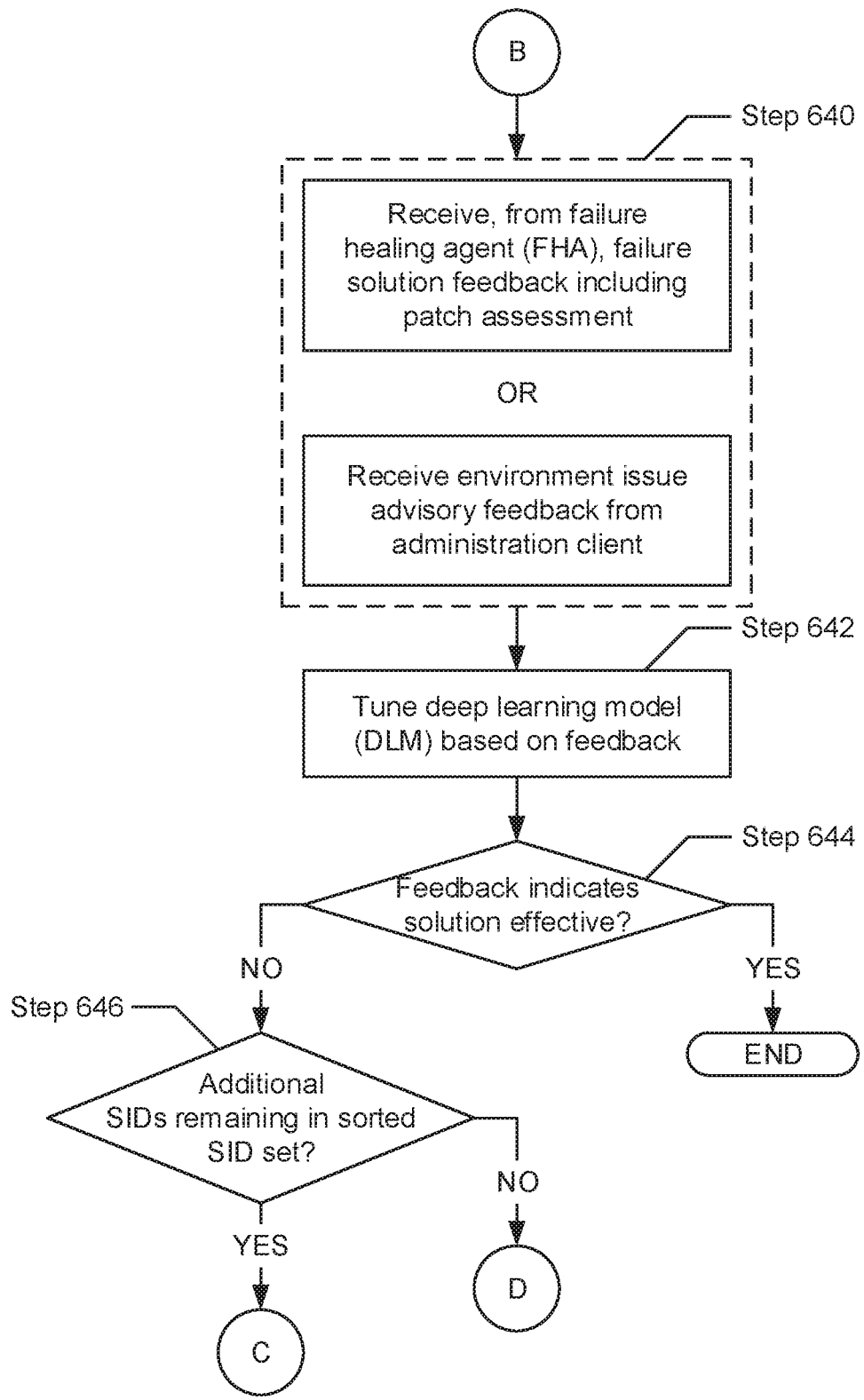

FIGS. 6A-6C show flowcharts describing a method for resolving a failure solution response in accordance with one or more embodiments of the invention.

The various steps outlined below may be performed by the failure healing intelligence (FHI) residing on the failure healing system (FHS) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 6A, in Step 600, a failure solution request is received. Specifically, in one embodiment of the invention, the failure solution request may be received from a failure healing agent (FHA) (see e.g., FIG. 1) either executing on a user client or the backup storage system (BSS). Further, the failure solution request may represent a query for available solutions, which may address a persistently-occurring failure plaguing one or more data backup and/or recovery operations instantiated on the user client or the BSS. Moreover, the failure solution request may include investigation pertinent information surrounding the persistently-occurring failure, which may include failure-pertinent information (FPI) and general configuration information (GCI).

In one embodiment of the invention, FPI may collectively represent metadata that describes the persistently-occurring failure. To that extent, FPI may encompass one or more failure factors. Each failure factor may be a piece of tracked information associated with the persistently-occurring failure, which may be generated and/or updated at the onset of each time that the persistently-occurring failure is observed. Examples of failure factors may include, but are not limited to: an error code or identifier assigned to the persistently-occurring failure, which uniquely identifies the persistently-occurring failure; an error message or description associated with the persistently-occurring failure, which concisely defines the persistently-occurring failure; and a failure stage associated with the persistently-occurring failure, which identifies a particular stage or step of a data backup and/or recovery operation during which the persistently-occurring failure transpires.

In one embodiment of the invention, GCI may collectively represent metadata that describes the computing environment on which the persistently-occurring failure has been observed. To that extent, GCI may encompass one or more configuration factors. Each configuration factor may be a piece of tracked information associated with hardware and/or software installed on the host (e.g., a user client or the BSS) on which a data backup and/or recovery operation is being performed. Examples of configuration factors may include, but are not limited to: an application type associated with a computer program (i.e., software application) installed on the host, where the computer program may be responsible for performing the data backup and/or recovery operation during which the persistently-occurring failure transpired; an application configuration associated with the aforementioned computer program, where the application configuration outlines one or more parameters (e.g., incremental or full backup, data component being backed up, destination media, etc.) used in the execution of the data backup and/or recovery operation during which the persistently-occurring failure transpired; and an applicable OS executing on the host on which the persistently-occurring failure transpired during the performance of the data backup and/or recovery operation.

In Step 602, a deep learning key (DLK) is generated using any subset or all of the FPI and GCI (obtained via the failure solution request received in Step 600). In one embodiment of the invention, the DLK may represent a combination of failure factors and/or configuration factors (described above), which may be sequenced in a particular order. Further, the DLK may represent input data, which can be processed by a deep learning model (DLM) (described below). By way of an example, the DLK may be a sequence of metadata that includes the following data items (described above) concatenated in the following order: {GCI: Application Type, GCI: Application Configuration, FPI: Error Code, FPI: Error Message, FPI: Failure Stage}.

In one embodiment of the invention, a DLM may be a machine learning and/or artificial intelligence paradigm (e.g., a neural network, a decision tree, a support vector machine, etc.) that may be employed as a data classifier. Any DLM may be defined through a set of parameters and/or hyper-parameters that may be optimized or tuned to assure the optimal performance of a function—e.g., the probabilistic matching of one or more available solutions, which may address a given persistently-occurring failure. A parameter may refer to a configuration variable that is internal to the DLM and whose value may be estimated from data. Examples of a parameter include, but are not limited to, the weights in a neural network, and the support vectors in a support vector machine. In contrast, a hyper-parameter may refer to a configuration variable that is external to the DLM and whose value may not be estimated from data. Examples of a hyper-parameter include, but are not limited to, the learning rate for training a neural network, and the soft margin cost function for a nonlinear support vector machine. Further, any DLM may be further defined through other architectural elements, which may vary depending on the paradigm based on which the DLM may be modeled.

For example, if a DLM follows a neural network design, other architectural elements that may be considered may include, but are not limited to: a number of layers, a number of nodes occupying each layer, an interconnectivity configuration between the various nodes, values for weights representative of the strengths of the various inter-nodal connections, propagation functions through which nodal outputs are computed with respect to nodal inputs and/or other parameters (e.g., weights), a specificity of a learning rule governing how the one or more parameters are adjusted to produce desired training results, etc. By way of another example, if a DLM follows a support vector machine design, other architectural elements that may be considered may alternatively include, but are not limited to: a number of support vectors defining hyperplane(s) that maximize the margins between classes, a kernel function for translating low dimensional input data into a higher dimensional space, a penalty value associated with an error term, a specificity of a kernel coefficient used for best-fitting the training data, etc.

In one embodiment of the invention, a DLM may be optimized through supervised learning. Supervised learning may refer to learning (or optimization) through the analyses of training examples and/or data. Substantively, through supervised learning, the various architectural elements (e.g., parameters, hyper-parameters, etc.) of a DLM may be adjusted through the successive processing of training or sample DLKs. After each training or sample DLK is fed into the DLM, which may be defined by various architectural elements set to specific values, an output (e.g., a solution probability matrix) may be obtained. The obtained output may subsequently be compared to a desired output for the training or sample DLK that had been fed into the DLM for processing. Thereafter, the values associated with the various architectural elements are adjusted based on the comparison between the obtained output and the desired output in view of a specified optimization goal (e.g., the minimization of errors between the obtained output and the desired output) being met.

Further, in one embodiment of the invention, as each successive training or sample DLK is processed, the adjusted values of the various architectural elements may be carried over into the processing of the subsequent training or sample DLK, where the various architectural elements may be further adjusted until the specified optimization goal for the subsequent training or sample DLK is also met. In one embodiment of the invention, the training/sample DLKs and corresponding desired outputs may be generated from any combination of information specified in the one or more entries of the failure solution repository (FSR) (see e.g., FIG. 3). One of ordinary skill will appreciate that other learning methodologies (e.g., unsupervised learning) may be used to optimize a DLM without departing from the scope of the invention. Substantively, in one embodiment of the invention, a DLM may include functionality to: receive input data (i.e., a DLK); process the input data using an optimized set of architectural element values; and produce output data (i.e., a solution probability matrix (described below)) based on the processing.

In Step 604, the DLK (generated in Step 602) is fed through an optimized DLM to obtain a solution probability matrix. In one embodiment of the invention, the solution probability matrix may be a data structure (e.g., a rectangular array) that includes a tuple of information for each available solution cataloged in the FSR (see e.g., FIG. 3). The tuple of information, for a given available solution, may at least include: (a) a solution identifier (SID) assigned to the given available solution; and (b) a probability value computed, by the DLM, for the given available solution. The SID may uniquely identify the given available solution and may map to an entry in the FSR, which may pertain to the given available solution. The probability value, meanwhile, may measure the likelihood that the given available solution addresses or resolves the persistently-occurring failure (based on the failure factors and/or configuration factors, associated with the persistently-occurring failure, which had been used to generate the DLK). One of ordinary skill will appreciate that additional information, other than the SID and the probability value for each available solution cataloged in the FSR, may be presented in the solution probability matrix without departing from the scope of the invention.

In Step 606, the solution probability matrix (obtained in Step 604) is filtered using a solution probability threshold. In one embodiment of the invention, the solution probability threshold may represent a minimum or goal probability value to be achieved, which when met or exceeded by a probability value, identifies an available solution associated with the probability value as a candidate for addressing and/or resolving the persistently-occurring failure. Filtering of the solution probability matrix using a solution probability threshold may, for example, entail (for each above-mentioned tuple of information): comparing the probability value in the tuple of information to the solution probability threshold; and, should the probability value meet or exceed the solution probability threshold based on the comparison, updating an initially empty SID set by adding the SID in the tuple of information to the SID set.

In Step 608, a determination is made as to whether the SID set (obtained via the filtering performed in Step 606) is an empty set. An empty SID set may result when none of the probability values, corresponding to the various available solutions, met or exceeded the solution probability threshold. In contrast, a non-empty SID set may result when at least one probability value, corresponding to at least one available solution, has met or exceeded the solution probability threshold. Accordingly, in one embodiment of the invention, if it is determined that the SID set is an empty set (i.e., includes zero SIDs), then the process may proceed to Step 610. On the other hand, in another embodiment of the invention, if it is alternatively determined that the SID set is a non-empty set (i.e., includes one or more SIDs), then the process may alternatively proceed to Step 620 (see e.g., FIG. 6B).

In Step 610, after determining (in Step 608) that zero SIDs have been identified and included in the SID set (obtained via the filtering performed in Step 606), a failure support request is issued. Specifically, in one embodiment of the invention, the failure support request may be generated and transmitted to the support client (see e.g., FIG. 1). The support client may represent any physical computing system operated by one or more support specialists of a client cluster environment (CCE). Further, a support specialist of the CCE may be an individual or entity whom may be responsible for troubleshooting hardware, software, and/or network issues pertinent to the CCE. Subsequently, in order to aid the support specialist(s) in investigating the persistently-occurring failure, which no available solution cataloged in the FSR can confidently address, the failure support request may include the FPI and the GCI surrounding the persistently-occurring failure (obtained via the failure solution request received in Step 600).

Turning to FIG. 6B, in Step 620, after alternatively determining (in Step 608) that one or more SIDs have been identified and included in the SID set (obtained via the filtering performed in Step 606), the SID set is sorted. In one embodiment of the invention, the SID set may be sorted based at least on the probability value associated with each SID of the SID set. For example, the one or more SIDs in the SID set may be sorted based on a scale of a highest to a lowest probability value. One of ordinary skill will appreciate that other probability value scales and/or additional tuple information may be used to sort the SID set without departing from the scope of the invention. Further, after the sorting, a sorted SID set may be obtained.

In Step 622, an SID from the sorted SID set (obtained in Step 620) is selected. In one embodiment of the invention, the selected SID may be a topmost positioned SID in the sorted SID set. In one or more other embodiments of the invention, the selected SID may be a bottommost or any other positioned SID in the sorted SID set. Thereafter, in Step 624, a lookup is performed of the FSR (see e.g., FIG. 3) using the SID (selected in Step 622). In one embodiment of the invention, the lookup may entail searching the FSR to identify a particular FSR entry, where the FSR entry includes an SID that matches the selected SID.

In Step 626, upon examining the FSR entry (identified in Step 624), a determination is made as to whether the FSR entry includes a failure solution patch (FSP). A FSP may refer to an upgrade, a patch, and/or a fix for one or more computer programs (e.g., an operating system (OS), one or more software applications, etc.) that may be executing on either a user client or the BSS on which the persistently-occurring failure is being observed. Further, the FSP may encompass one or more binary files representative of computer readable program code that may be interpreted and executed by the underlying hardware of the user client or the BSS. In interpreting and executing the one or more binary files, the underlying hardware may apply the FSP, thereby implementing the upgrade, patch, and/or fix targeting the one or more computer programs. Accordingly, in one embodiment of the invention, if it is determined that the FSR entry does not include a FSP, then the process may proceed to Step 628. On the other hand, in another embodiment of the invention, if it is alternatively determined that the FSR entry indeed includes a FSP, then the process may alternatively proceed to Step 630.

In Step 628, after determining (in Step 626) that the FSR entry (identified in Step 624) does not include a FSP, an environment issue advisory is issued. Specifically, in one embodiment of the invention, the environment issue advisory may be generated and transmitted to an administrator client (see e.g., FIG. 1). The administrator client may represent any physical computing system operated by one or more administrators of a client cluster environment (CCE). Further, an administrator of the CCE may be an individual or entity whom may be responsible for overseeing operations and maintenance pertinent to the CCE. Subsequently, in one embodiment of the invention, the environment issue advisory may be a notification, which may inform the administrator(s) of the CCE that the persistently-occurring failure (for which available solutions had been sought) may be cause by a computing environment configuration issue. Examples of computing environment configuration issues may include, but are not limited to: an incorrect state of data backup writers (e.g., services that may capture and create snapshots); incorrect storage related conditions, which may fail to meet the prerequisites for snapshot generation; and other conditions that can hamper successful backup operations. Accordingly, to aid the administrator(s) of the CCE in troubleshooting through the identified computing environment configuration issue, the environment issue advisory may include any subset of information (i.e., metadata) specified in the FSR entry (identified in Step 624). Hereinafter, the process may proceed to Step 640 (see e.g., FIG. 6C).

In Step 630, after alternatively determining (in Step 626) that the FSR entry (identified in Step 624) includes a FSP, a failure solution response is generated. In one embodiment of the invention, the failure solution response may be a reply to the failure solution request (received in Step 600). Further, the failure solution response may be generated using at least the FSP included in the identified FSR entry. Thereafter, in Step 632, the failure solution response (generated in Step 630) is subsequently transmitted to the FHA either executing on a user client or the BBS from which the failure solution request had been submitted. Afterwards, the process may proceed to Step 640 (see e.g., FIG. 6C).

Turning to FIG. 6C, in Step 640, feedback is received. That is, in one embodiment of the invention, failure solution feedback may be received from the FHA (to which the failure solution response had been transmitted in Step 632). The failure solution feedback may represent the return of information regarding the performance evaluation (i.e., effectiveness) of the FSP (included in the failure solution response) in addressing the persistently-occurring failure. Subsequently, the failure solution feedback may include a patch assessment. The patch assessment may indicate that: (a) the persistently-occurring failure persists, and therefore, the FSP has been ineffective; or (b) the persistently-occurring failure has been resolved, and therefore, the FSP has been effective.

In another embodiment of the invention, environment issue advisory feedback may be received from the administrator client (to which the environment issue advisory had been transmitted in Step 628). The environment issue advisory feedback may represent the return of information regarding the computing environment configuration issue (identified in the environment issue advisory) that may be causing the persistently-occurring failure. Subsequently, the environment issue advisory feedback may include a configuration assessment. The configuration assessment may indicate that: (a) the persistently-occurring failure persists, and therefore, the identified computing environment configuration issue is not the culprit or cause; or (b) the persistent-occurring failure has subsided, and therefore, the identified computing environment configuration issue had been the root of the failure.

In Step 642, the DLM (used in Step 604) is tuned based on the feedback (received in Step 640). In one embodiment of the invention, tuning of the DLM may entail re-optimizing the DLM through the re-adjustment of the various architectural elements (e.g., parameters, hyper-parameters, etc.) defining the DLM.

In Step 644, a determination is made as to whether the feedback (received in Step 640) indicated that the available solution (presented via the environment issue advisory transmitted in Step 628 or the failure solution response transmitted in Step 632) had been effective at addressing and/or resolving the persistently-occurring failure. In one embodiment of the invention, if it is determined that the feedback had indicated that the available solution had been ineffective, then the process may proceed to Step 646. On the other hand, in another embodiment of the invention, if it is alternatively determined that the feedback had indicated that the available solution had been effective, then the process ends.

In Step 646, after determining (in Step 644) that the feedback (received in Step 640) had indicated that the available solution (presented via the environment issue advisory transmitted in Step 628 or the failure solution response transmitted in Step 632) had been ineffective at addressing and/or resolving the persistently-occurring failure, another determination is made as to whether any additional (yet to be selected) SIDs remain in the sorted SID set (obtained in Step 620). Subsequently, in one embodiment of the invention, if it is determined that at least one unselected SID remains in the sorted SID set, then the process may proceed to Step 622 (see e.g., FIG. 6B), where a SID of the at least one unselected SIDs may be selected. The SID may be associated with another available solution, which may or may not address and/or resolve the persistently-occurring failure. On the other hand, in another embodiment of the invention, if it is alternatively determined that zero unselected SIDs remain in the sorted SID set, then the process may alternatively proceed to Step 610 (see e.g., FIG. 6A), where a failure support request may subsequently be issued to the support client.

Figure 7:
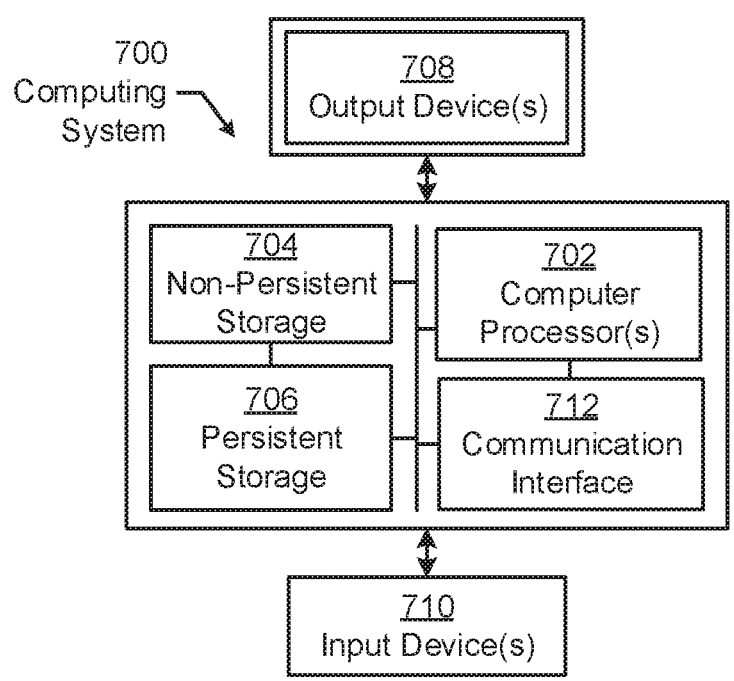
FIG. 7 shows a computing system in accordance with one or more embodiments of the invention.

FIG. 7 shows a computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

FIGS. 8A-8E show various aspects pertinent to example scenarios in accordance with one or more embodiments of the invention. The following example scenarios, presented in conjunction with components shown in FIGS. 8A-8E, are for explanatory purposes only and not intended to limit the scope of the invention.

Figure 8A:
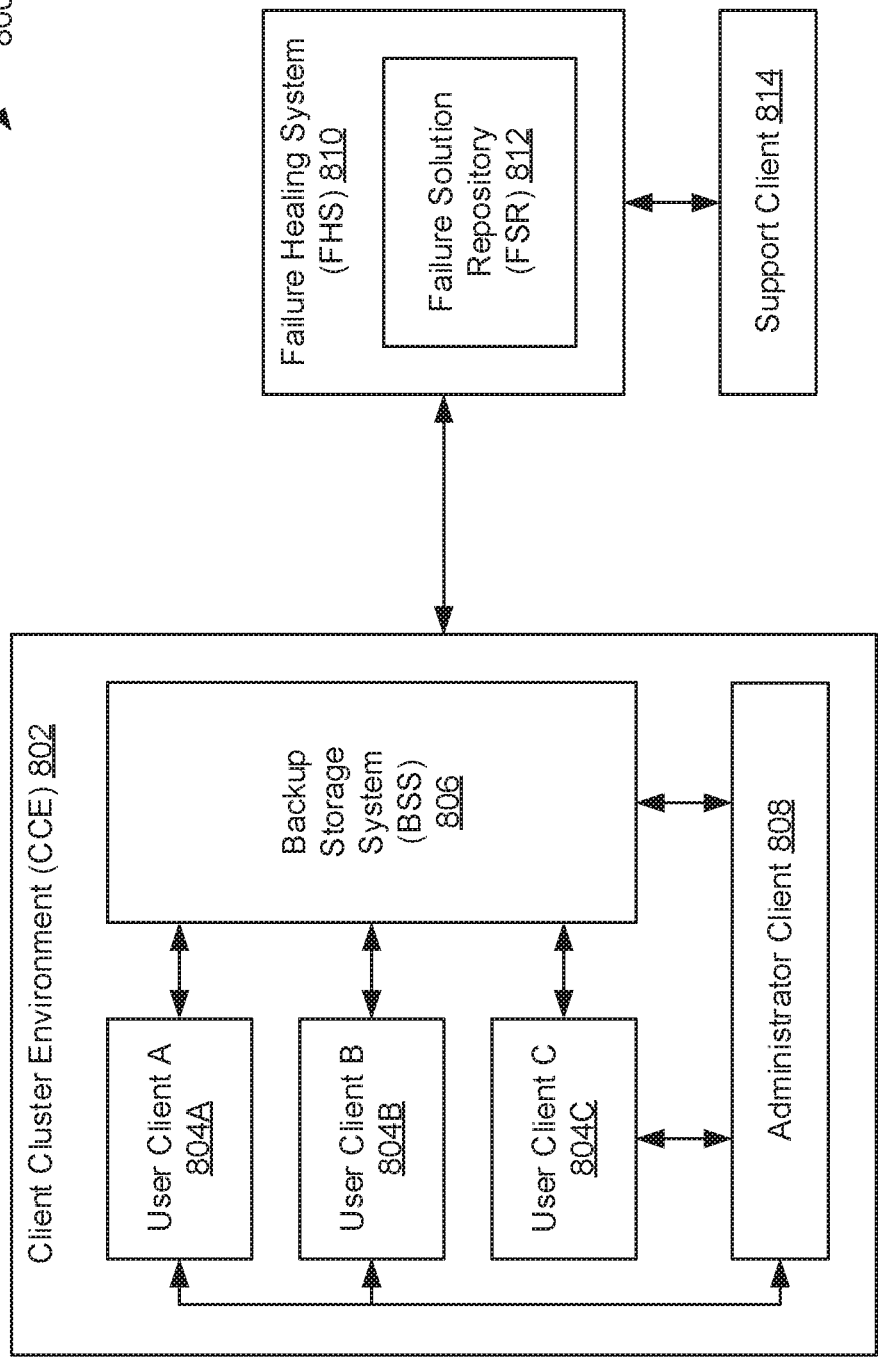
FIGS. 8A-8E show various aspects pertinent to example scenarios in accordance with one or more embodiments of the invention.

Turning to FIG. 8A, an example system (800) is illustrated. The example system (800) includes a client cluster environment (CCE) (802) operatively connected to a failure healing system (FHS) (810), which in turn is operatively connected to a support client (814). Further, the CCE (802) includes three user clients (804A-804C), a backup storage system (BSS) (806), and an administrator client (808). Moreover, the FHS (810) includes a failure solution repository (FSR) (812).

Figure 8B:
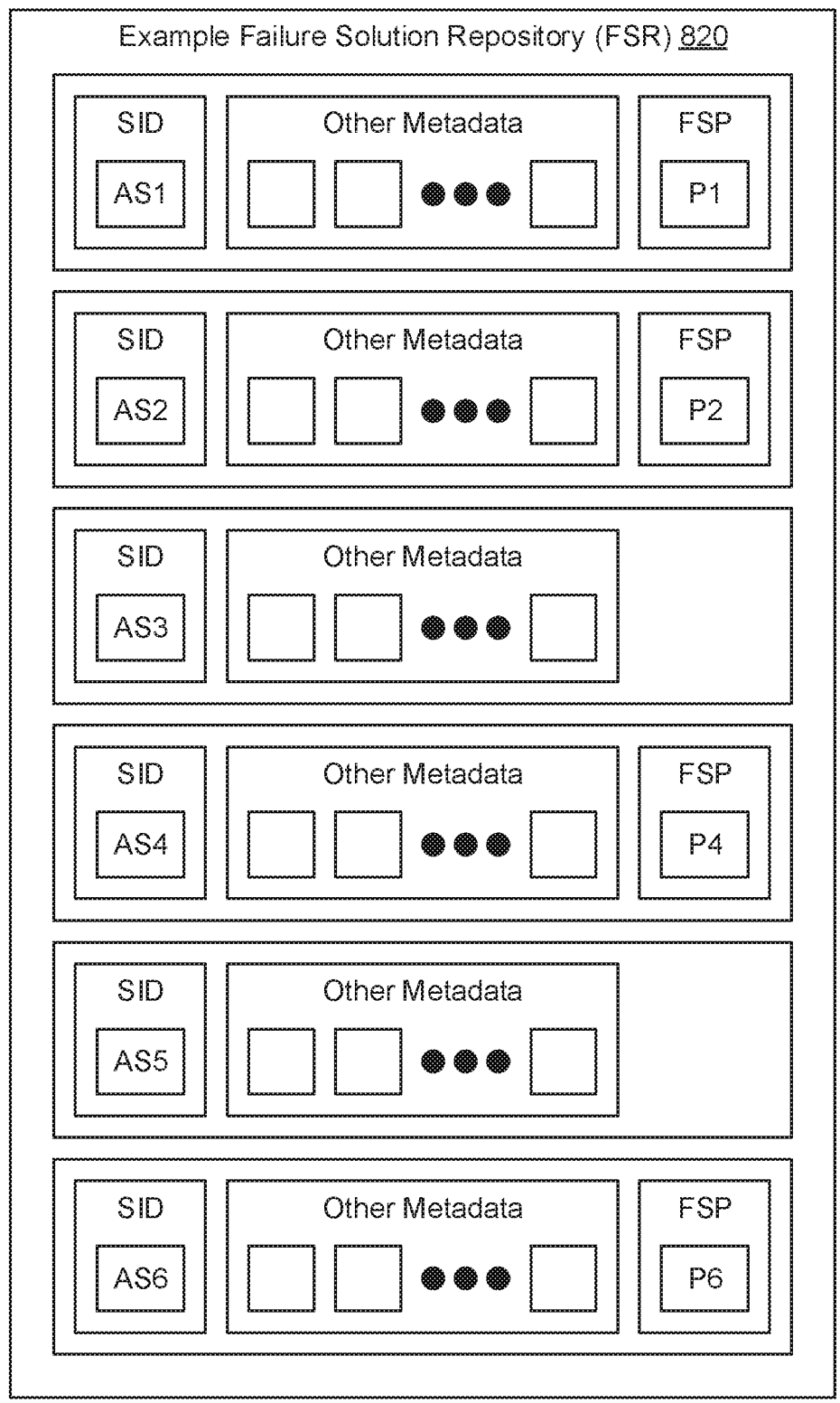

Turning to FIG. 8B, an example FSR (820) is portrayed. The example FSR (820) includes six entries. Each entry specifies information pertaining to an available solution, which includes: (a) a solution identifier (SID) (e.g., AS1, AS2, . . . , AS6) assigned to the available solution; (b) other metadata (e.g., relevant module, relevant operation, relevant OS, etc.) (see e.g., FIG. 3) associated with the available solution; and (c) (optionally) a failure solution patch (FSP) (e.g., P1, P2, P4, P6) representative of an upgrade, patch, and/or fix for one or more computer programs.

Example Scenario 1

Figure 8C:
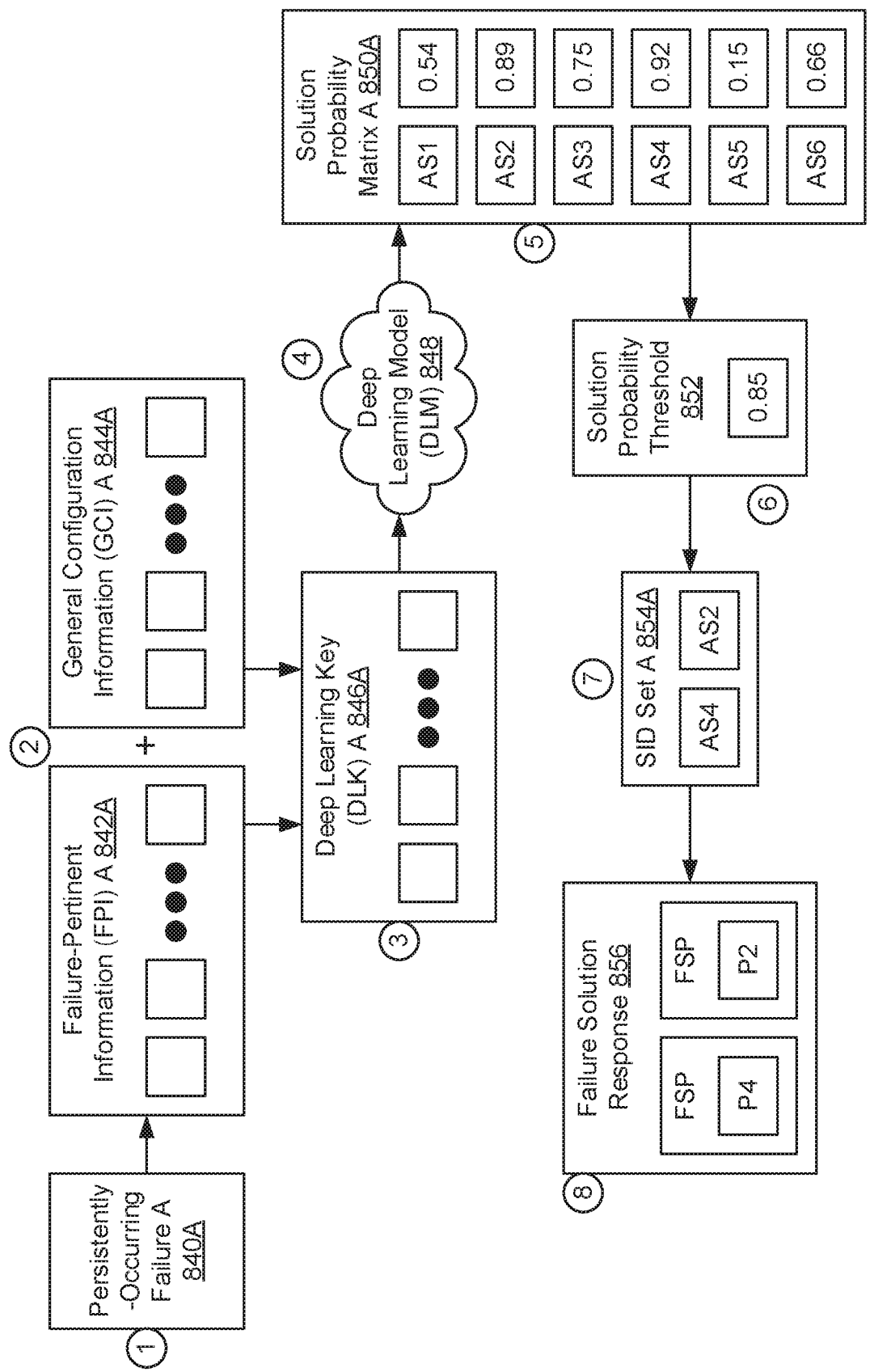

A first example scenario is outlined in FIG. 8C. In this first example scenario, the following steps may transpire in accordance with embodiments of the invention: (1) the data backup agent (DBA) (not shown) on a first user client (804A), while executing one or more data backup and/or recovery operations thereon, observes a first persistently-occurring failure (840A) and notifies the failure healing agent (FHA) (not shown) on the first user client (804A); (2) in response to being notified, the FHA obtains investigation pertinent information (i.e., one or more failure factors constituting failure-pertinent information (FPI) (842A) and/or one or more configuration factors constituting general configuration information (GCI) (844A)) surrounding the first persistently-occurring failure (840A) and transmits the information to a failure healing intelligence (FHI) (not shown) on the FHS (810); (3) using at least a portion of the FPI (842A) and/or GCI (844A), the FHI generates a first deep learning key (DLK) (846A); (4) the FHI subsequently processes the first DLK (846A) using a deep learning model (DLM) (848); (5) the DLM (848) outputs a first solution probability matrix (850A) including a tuple of information for each available solution in the example FSR (820), where the tuple of information includes the SID assigned to a given available solution and a derived probability value for the given available solution; (6) the FHI then filters the first solution probability matrix (850A) using a solution probability threshold (852); (7) in performing the filtering, the FHI obtains a first SID set (854A), which includes each SID (e.g., AS4, AS2) from the first solution probability matrix (850A) associated with a probability value that met or exceeded the solution probability threshold (852); and (8)

using each SID in the first SID set (854A), the FHI: (a) identifies a respective FSR (820) entry; (b) determines whether a FSP is included in the identified FSR (820) entry; (c) in determining that there the identified FSR (820) entry does include a FSP, obtains the FSP (e.g., P4, P2); and (d) transmits the obtained FSP, via a failure solution response (856), to the FHA on the first user client (804A), where the FHA subsequently applies the FSP and reports back on the effectiveness of the FSP to address and/or resolve the first persistently-occurring failure (840A).

Example Scenario 2

Figure 8D:
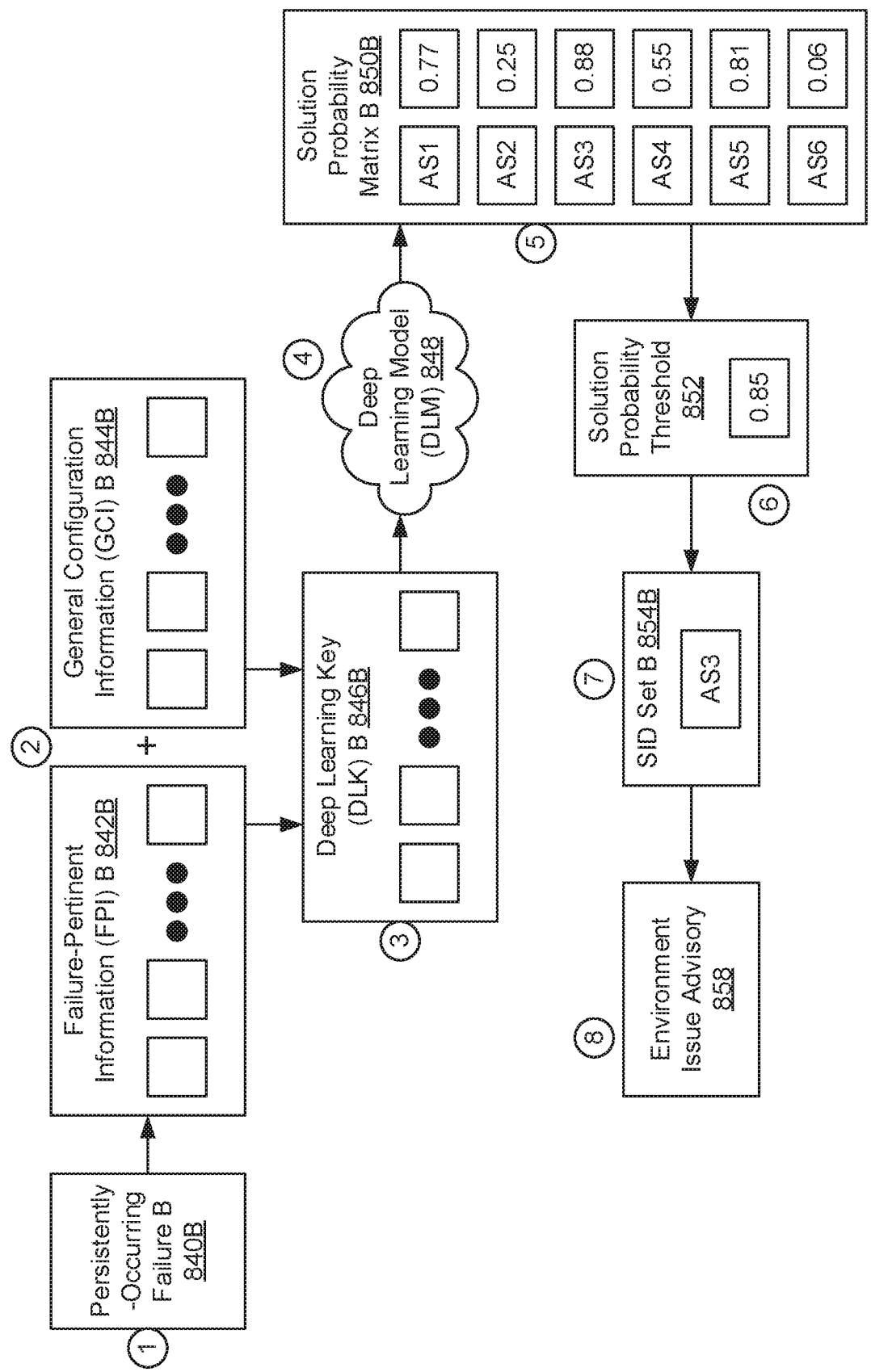

A second example scenario is outlined in FIG. 8D. In this second example scenario, the following steps may transpire in accordance with embodiments of the invention: (1) the DBA on a third user client (804C), while executing one or more data backup and/or recovery operations thereon, observes a second persistently-occurring failure (840B) and notifies the FHA on the third user client (804C); (2) in response to being notified, the FHA obtains investigation pertinent information (i.e., one or more failure factors constituting FPI (842B) and/or one or more configuration factors constituting GCI (844B)) surrounding the second persistently-occurring failure (840B) and transmits the information to the FHI on the FHS (810); (3) using at least a portion of the FPI (842B) and/or GCI (844B), the FHI generates a second DLK (846B); (4) the FHI subsequently processes the second DLK (846B) using the DLM (848); (5) the DLM (848) outputs a second solution probability matrix (850B) including a tuple of information for each available solution in the example FSR (820), where the tuple of information includes the SID assigned to a given available solution and a derived probability value for the given available solution; (6) the FHI then filters the second solution probability matrix (850B) using the solution probability threshold (852); (7) in performing the filtering, the FHI obtains a second SID set (854B), which includes each SID (e.g., AS3) from the second solution probability matrix (850B) associated with a probability value that met or exceeded the solution probability threshold (852); and (8) using each SID in the second SID set (854B), the FHI: (a) identifies a respective FSR (820) entry; (b) determines whether a FSP is included in the identified FSR (820) entry; (c) in determining that the identified FSR (820) entry does not include a FSP, obtains at least a portion of the other metadata specified therein; and (d) generates and transmits, to the administrator client (808), an environment issue advisory (858) including the obtained other metadata.

Example Scenario 3

Figure 8E:
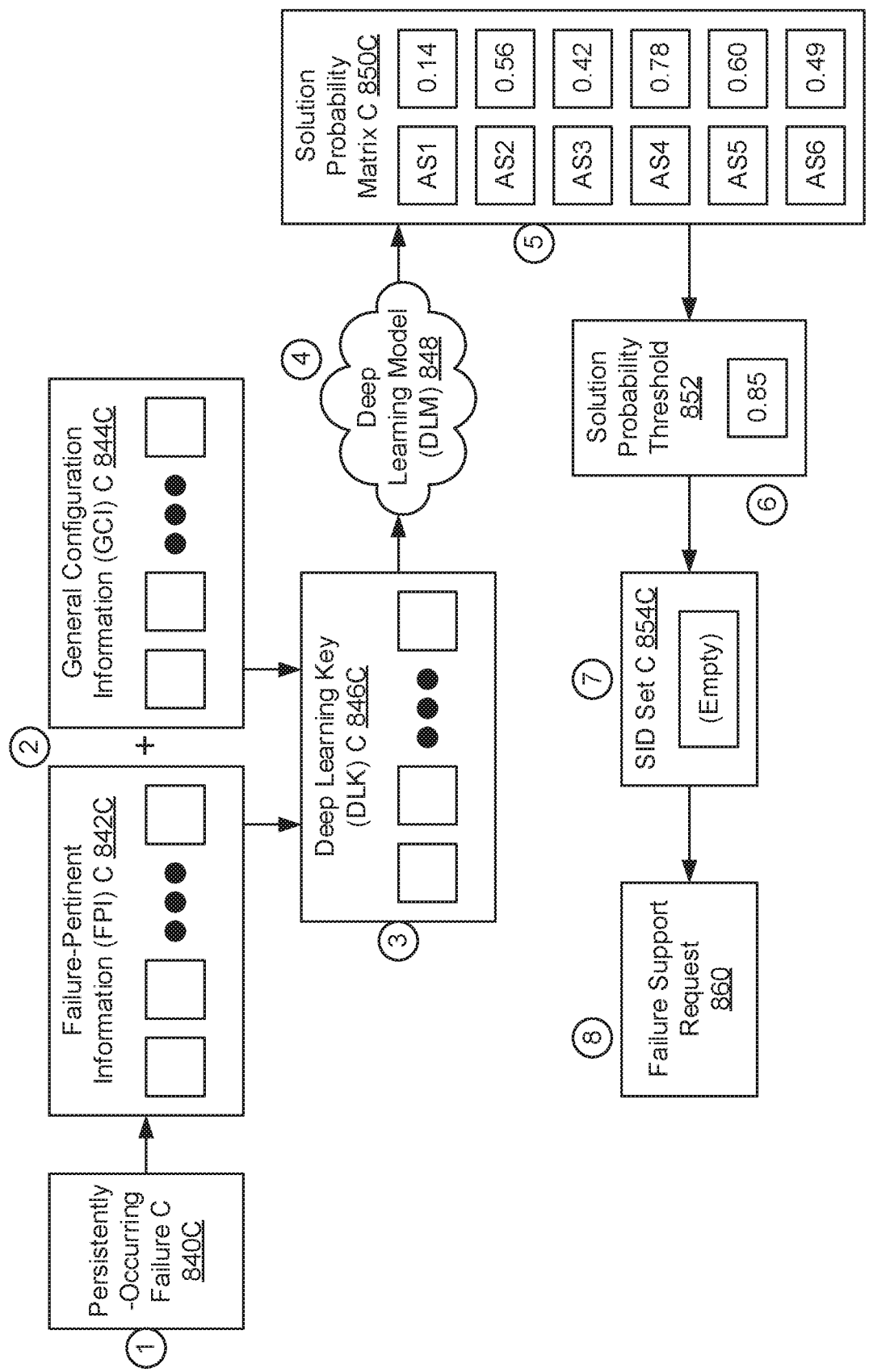

A third example scenario is outlined in FIG. 8E. In this third example scenario, the following steps may transpire in accordance with embodiments of the invention: (1) the DBA on the BSS (806), while executing one or more data backup and/or recovery operations thereon, observes a third persistently-occurring failure (840C) and notifies the FHA on the BSS (806); (2) in response to being notified, the FHA obtains investigation pertinent information (i.e., one or more failure factors constituting FPI (842C) and/or one or more configuration factors constituting GCI (844C)) surrounding the third persistently-occurring failure (840C) and transmits the information to the FHI on the FHS (810); (3) using at least a portion of the FPI (842C) and/or GCI (844C), the FHI generates a third DLK (846C); (4) the FHI subsequently processes the third DLK (846C) using the DLM (848); (5) the DLM (848) outputs a third solution probability matrix (850C) including a tuple of information for each available solution in the example FSR (820), where the tuple of information includes the SID assigned to a given available solution and a derived probability value for the given available solution; (6) the FHI then filters the third solution probability matrix (850C) using the solution probability threshold (852); (7) in performing the filtering, the FHI obtains a second SID set (854C), which includes each SID from the third solution probability matrix (850C) associated with a probability value that met or exceeded the solution probability threshold (852)—resulting in an empty set; and (8) based on the third SID set (854C) being an empty set, the FHI transmits a failure support request (860) to the support client (814), where the failure support request (860) may include the FPI (842C) and/or the GCI (844C).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for resolving failures recurring in information technology (IT) environments, comprising:
    receiving, from a first failure healing agent (FHA), a first failure solution request comprising a first failure-pertinent information (FPI) and a first general configuration information (GCI);
    generating a first deep learning key (DLK) using the first FPI and the first GCI;
    processing the first DLK using a deep learning model (DLM) to obtain a first solution probability matrix, wherein the DLM uses parameters, hyper-parameters, and architectural elements to obtain the first solution probability matrix;
    filtering the first solution probability matrix using a solution probability threshold, to obtain a first solution identifier (SID);
    identifying a first failure solution repository (FSR) entry associated with the first SID;
    making a first determination that the first FSR entry comprises a first failure solution patch (FSP);
    generating, based on the first determination, a first failure solution response using at least the first FSP;
    transmitting, in response to the first failure solution request, the first failure solution response to the first FHA;
    applying, by the first FHA, the first failure solution response to a host on which the first FHA resides;
    determining, by the FHA, a patch assessment, wherein the patch assessment indicates the success or failure of the first failure solution response;
    receiving, from the first FHA, a failure solution feedback comprising the patch assessment; and
    tuning the parameters and hyper-parameters of the DLM based on the patch assessment,
    wherein the first FPI comprises metadata describing a persistently-occurring failure observed on the host on which the first FHA resides, and
    wherein the persistently-occurring failure is associated with one selected from a group consisting of a data backup operation and a data recovery operation.

2. The method of claim 1, wherein the first GCI comprises metadata describing at least one selected from a group consisting of hardware configuration and software configuration, of the host on which the first FHA resides.

3. The method of claim 1, further comprising:
making a second determination, based on the patch assessment, that the first FSP was ineffective; and
issuing, based on the second determination, a failure support request to a support client.

4. The method of claim 1, further comprising:
making a second determination, based on the patch assessment, that the first FSP was ineffective;
obtaining, based on the second determination, a second SID from filtering the first solution probability matrix using the solution probability threshold;
identifying a second FSR entry associated with the second SID;
making a third determination that the second FSR entry comprises a second FSP;
generating, based on the third determination, a second failure solution response using at least the second FSP; and
transmitting, in response to the failure solution feedback, the second failure solution response to the first FHA.

5. The method of claim 4, wherein a first solution probability value associated with the first SID is higher than a second solution probability value associated with the second SID.

6. The method of claim 1, further comprising:
receiving, from a second FHA, a second failure solution request comprising a second FPI and a second GCI;
generating a second DLK using the second FPI and the second GCI;
processing the second DLK using the DLM to obtain a second solution probability matrix;
filtering the second solution probability matrix using the solution probability threshold, to obtain a second SID;
identifying a second FSR entry associated with the second SID;
making a second determination that the second FSR entry lacks a FSP; and
issuing, based on the second determination, an environment issue advisory to an administrator client.

7. The method of claim 1, further comprising:
receiving, from a second FHA, a second failure solution request comprising a second FPI and a second GCI;
generating a second DLK using the second FPI and the second GCI;
processing the second DLK using the DLM to obtain a second solution probability matrix;
filtering the second solution probability matrix using the solution probability threshold, to obtain zero SIDs; and
issuing, based on obtaining zero SIDs, a failure support request to a support client.

8. A system, comprising:
a plurality of computer processors operatively connected to one another;
a failure healing agent (FHA) executing on a first computer processor of the plurality of computer processors; and
a failure healing intelligence (FHI) executing on a second computer processor of the plurality of computer processors, and programmed to:
receive, from the FHA, a failure solution request comprising a failure-pertinent information (FPI) and a general configuration information (GCI);
generate a deep learning key (DLK) using the FPI and the GCI;
process the DLK using a deep learning model (DLM) to obtain a solution probability matrix, wherein the DLM uses parameters, hyper-parameters, and architectural elements to obtain the first solution probability matrix;
filter the solution probability matrix using a solution probability threshold, to obtain a solution identifier (SID);
identify a failure solution repository (FSR) entry associated with the SID;
make a determination that the FSR entry comprises a failure solution patch (FSP);
generate, based on the determination, a failure solution response using at least the FSP;
transmit, in response to the failure solution request, the failure solution response to the FHA;
apply, by the first FHA, the failure solution response to a host on which the first FHA resides;
determine, by the FHA, a patch assessment, wherein the patch assessment indicates the success or failure of the first failure solution response;
receive, from the FHA, a failure solution feedback comprising the patch assessment; and
tuning the parameters and hyper-parameters of the DLM based on the patch assessment,
wherein the FPI comprises metadata describing a persistently-occurring failure observed on the host on which the FHA resides, and
wherein the persistently-occurring failure is associated with one selected from a group consisting of a data backup operation and a data recovery operation.

9. The system of claim 8, further comprising:
a user client comprising:
the first computer processor;
a data backup agent (DBA) also executing on the first computer processor; and
a local storage repository (LSR) operatively connected to the first computer processor.

10. The system of claim 8, further comprising:
a backup storage system (BSS) comprising:
the first computer processor;
a data backup agent (DBA) also executing on the first computer processor; and
a backup storage repository (BSR) operatively connected to the first computer processor.

11. The system of claim 8, further comprising:
a failure healing system (FHS) comprising a failure solution repository (FSR) operatively connected to the second computer processor,
wherein the FSR comprises the FSR entry.

12. A non-transitory computer readable medium (CRM) comprising computer readable program code, which when executed by a computer processor, enables the computer processor to:
receive, from a first failure healing agent (FHA), a first failure solution request comprising a first failure-pertinent information (FPI) and a first general configuration information (GCI);
generate a first deep learning key (DLK) using the first FPI and the first GCI;
process the first DLK using a deep learning model (DLM) to obtain a first solution probability matrix, wherein the DLM uses parameters, hyper-parameters, and architectural elements to obtain the first solution probability matrix;

filter the first solution probability matrix using a solution probability threshold, to obtain a first solution identifier (SID);

identify a first failure solution repository (FSR) entry associated with the first SID;

make a first determination that the first FSR entry comprises a first failure solution patch (FSP);

generate, based on the first determination, a first failure solution response using at least the first FSP;

transmit, in response to the first failure solution request, the first failure solution response to the first FHA, apply, by the first FHA, the first failure solution response to a host on which the first FHA resides;

determine, by the FHA, a patch assessment, wherein the patch assessment indicates the success or failure of the first failure solution response;

receive, from the first FHA, a failure solution feedback comprising a patch assessment; and tune the parameters and hyper-parameters of the DLM based on the patch assessment, wherein the first FPI comprises metadata describing a persistently-occurring failure observed on the host on which the first FHA resides, and wherein the persistently-occurring failure is associated with one selected from a group consisting of a data backup operation and a data recovery operation.

13. The non-transitory CRM of claim 12, further comprising computer readable program code, which when executed by the computer processor, enables the computer processor to:

make a second determination, based on the patch assessment, that the first FSP was ineffective; and issue, based on the second determination, a failure support request to a support client.

14. The non-transitory CRM of claim 12, further comprising computer readable program code, which when executed by the computer processor, enables the computer processor to:

make a second determination, based on the patch assessment, that the first FSP was ineffective;

obtain, based on the second determination, a second SID from filtering the first solution probability matrix using the solution probability threshold;

identify a second FSR entry associated with the second SID;

make a third determination that the second FSR entry comprises a second FSP;

generate, based on the third determination, a second failure solution response using at least the second FSP; and transmit, in response to the failure solution feedback, the second failure solution response to the first FHA.

15. The non-transitory CRM of claim 12, further comprising computer readable program code, which when executed by the computer processor, enables the computer processor to:

receive, from a second FHA, a second failure solution request comprising a second FPI and a second GCI;

generate a second DLK using the second FPI and the second GCI;

process the second DLK using the DLM to obtain a second solution probability matrix;

filter the second solution probability matrix using the solution probability threshold, to obtain a second SID;

identify a second FSR entry associated with the second SID;

make a second determination that the second FSR entry lacks a FSP; and issue, based on the second determination, an environment issue advisory to an administrator client.

16. The non-transitory CRM of claim 12, further comprising computer readable program code, which when executed by the computer processor, enables the computer processor to:

receive, from a second FHA, a second failure solution request comprising a second FPI and a second GCI;

generate a second DLK using the second FPI and the second GCI;

process the second DLK using the DLM to obtain a second solution probability matrix;

filter the second solution probability matrix using the solution probability threshold, to obtain zero SIDs; and issue, based on obtaining zero SIDs, a failure support request to a support client.

* * * * *